United States Patent [19]

Gross, Jr. et al.

[11] 3,809,338

[45] May 7, 1974

[54] TIMER AND APPROACH PLATE HOLDER FOR AIRCRAFT

[76] Inventors: Edward L. Gross, Jr., 1327 Ward St., N.W., Warren, Ohio 44485; William R. Pyne, 3271 Winchell Rd., Mantua, Ohio 44255; Donald L. Yauger, 1661 West Ave., Warren, Ohio 44483

[22] Filed: Sept. 21, 1973

[21] Appl. No.: 399,284

[52] U.S. Cl. .................. 244/1 R, 248/115, 248/230
[51] Int. Cl. ............................................ B64d 43/00
[58] Field of Search ....... 244/1 R, 129 R; 248/74 R, 248/115, 230; 24/67.5; 224/4 A

[56] References Cited
UNITED STATES PATENTS
1,957,052  5/1934  Powers............................ 248/115

Primary Examiner—Milton Buchler
Assistant Examiner—Barry L. Kelmachter
Attorney, Agent, or Firm—John F. Luhrs

[57] ABSTRACT

A timer and approach plate holder for aircraft having a spring clip for mounting the holder on the horizontal shaft of the aircraft control yoke, and upwardly extending post bottomed on the shaft secured to the clip supporting at its upper end an alligator clip having jaws spring urged toward each other for grasping an approach plate and a support for a timer secured to the alligator clip forming a manually operable lever for opening the jaws for the quick and convenient insertion and removal of an approach plate.

6 Claims, 3 Drawing Figures

PATENTED MAY 7 1974　3,809,338

TIMER AND APPROACH PLATE HOLDER FOR AIRCRAFT

This invention relates to an aircraft navigational aid especially useful to pilots flying without the assistance of co-pilots or navigators. A particular problem confronts such pilots in making a proper approach to an airport and in maneuvering the aircraft to a landing. At this time, in addition to observing several instruments, it is necessary that the pilot maintain the aircraft on courses as specified on the approach plate for the particular airport in question. Such approach plates spell out the altitude and increments of time at given speeds the aircraft should maintain, defined courses in making a landing, and similar instructions for an aircraft which misses the approach. Such approach plates are usually carried in a notebook, a clipboard, or the like, while the timer is carried in the hand of the pilot or hung, more or less haphazardly, at some convenient location in the cockpit of the aircraft.

With the foregoing in mind it is an object of this invention to provide an accessory for mounting the approach plate and the timer used in conjunction therewith in full view of the pilot while permitting him concurrently to observe all critical instruments.

A further object of the invention is to provide a holder which places the timer and approach plate in the forward line of vision of the pilot so that it is unnecessary that he direct his vision sideways or up or down in reading the approach plate or timer during the critical period in making an approach to a landing.

It is still another object of the invention to provide such an accessory which may be easily mounted on and removed from the shaft of an aircraft control yoke, which is readily adaptable to shafts of different diameters and while being well constructed and suitable for the intended use, may be manufactured cheaply and hence sold at a nominal price.

Further objects will be apparent from the following description and drawings in which:

DETAILED DESCRIPTION

Figures 1, 2, 3:
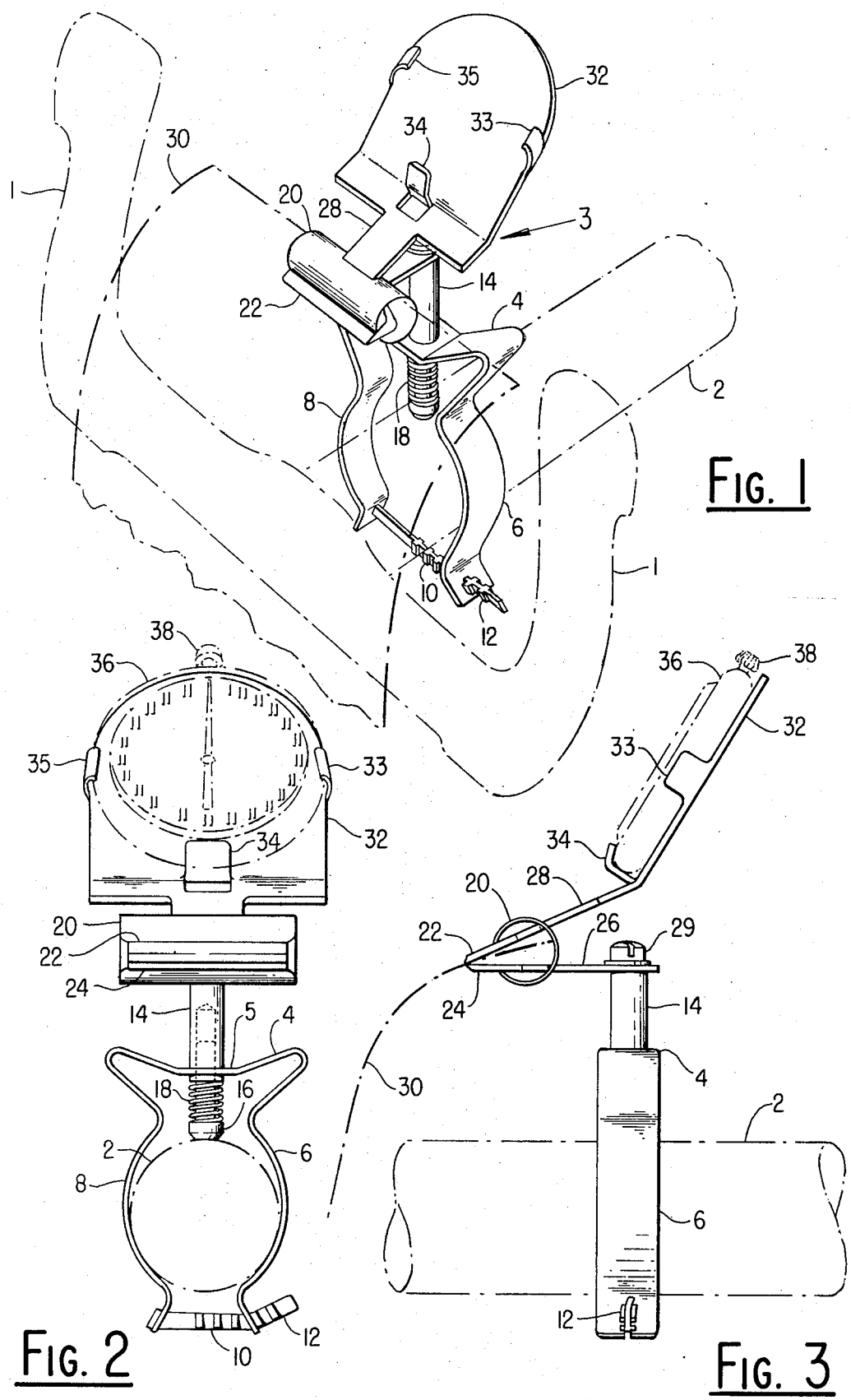
FIG. 1 is a perspective view of the timer and approach plate holder showing it mounted in a typical fashion, on the shaft of an aircraft control yoke.
FIG. 2 is a front elevation view of the holder.
FIG. 3 is a side elevation view of the holder.

Referring now to the drawings, as shown in FIG. 1, the usual aircraft is provided with a pilot operated control yoke 1 carried by a substantially horizontal control shaft 2, axially and angularly positioned about its longitudinal axis as the pilot moves the control yoke forward or backward or turns the yoke in one direction or the other. Located directly in front of the pilot, above the control shaft, is the instrument panel (not shown) carrying an array of instruments necessary for the proper navigation of the craft. In making an approach to and landing on a specific airport it is necessary that the pilot not only maintain a close scrutiny of several of the instruments, but simultaneously observe the approach pattern specified on the approach plate for that particular airport. In maintaining the pattern it is necessary that the pilot stay on specified courses for stipulated increments of time depending upon the speed of the craft. Hence, it is necessary, that the pilot have available a timer for use in conjunction with the approach plate. Obviously, if it is necessary for the pilot to change his line of vision in directing his attention from the instruments to the approach plate and timer and vice versa, the probability of the approach being improperly made is increased. Furthermore, as it is necessary that the timer be reset as the approach pattern develops, unless it is conveniently located for operation by the pilot while maintaining abservation of the critical instruments, the probability of an improper or missed approach is further increased.

As shown in the drawings, the timer and approach plate holder, generally indicated at 3, of this invention, is conveniently mounted in a generally vertical position on the horizontal shaft 2 by means of a spring clip 4 having legs 6 and 8 of circular configuration which are adapted to straddle the shaft 2 and through the inherent spring action of the clip have sufficient frictional engagement therewith to maintain the holder in the desired upright position. The spring clip for mounting the holder also renders the holder easily adaptable to shafts of different diameters. If desired, the frictional engagement with the shaft 2 may be further increased by means of a tension spring, shown in the drawings, as comprising an elastic band 10. One end of the spring or band 10 is fastened to the leg 8 of the spring clip 4. The leg 6 of the spring clip is provided with a slot for receiving the spring, the tension of which may be adjusted by means of the transversely extending projections 12 with which the band 10 is provided.

Carried by a horizontal section 5 (FIG.2) of the clip 4 is an upwardly extending post 14 having a downwardly extending section 16 which telescopes into an axial bore in the post 14, and which is held in frictional engagement with the shaft 2 by means of a coiled spring 18. Thus the holder is readily adaptable to shafts of different diameter through the provision of the spring clip having the legs 6 and 8 which grasp the cylindrical wall of the shaft 2, the provision of the adjustable spring or elastic 10, and the provision of the downwardly extending extention 16 held in frictional engagement with the shaft 2 by means of the spring 18.

Mounted on the upper end of the post 14 and extending at a right angle therefrom is a alligator clip 20 having jaws 22 and 24 and manually operable fingers 26 and 28 for opening the jaws against the internal spring action of the clip which normally holds the jaws closed. As shown, the alligator clip 20 is mounted on the upper end of the post 14 by securing the finger 26 to the post by means of a screw 29. The finger 26 and lower jaw 24 are thus held stationary, while the jaws are opened against the spring action of the clip by manually positioning the finger 28 in a downward direction. Thus, an approach plate 30, shown in fragmentary form in FIG. 1, may be readily inserted between or removed from the jaws through manual manipulation of the finger 28 and when held by the jaws is in the direct forward line of vision of the pilot.

Carried by the finger 28 is a platform 32 having edge clips 33, 34, and 35 adapted to receive and hold in position a timer such as shown at 36. The platform 32 extends upwardly at an angle with respect to the finger 28 placing the timer 36 in the forward line of vision of the pilot. As evident, by the arrangement shown, the stop, start, reset button 38 of the timer 36 is also placed within easy reach of the pilot so that the approach pattern set forth on the approach plate may be followed with ease.

It will be apparent that the embodiment of our invention shown and described is by way of example only, and that various modifications can be made within the scope of the invention as defined in the appended claims.

We claim:

1. A timer and approach plate holder for an aircraft having a substantially horizontal control shaft, comprising in combination, an alligator clip for holding the approach plate having jaws spring urged to a closed position and a pair of manually operated fingers for opening said jaws against the spring closing action, a post, means for mounting said post on said control shaft at substantially right angles to the longitudinal center thereof, means securing one of said fingers to the end of said post remote from the control shaft, the other of said fingers provided with a platform having a plurality of peripheral spring clips for mounting and holding a timer in fixed position, whereby manual pressure applied to said last named finger opens the jaws of said alligator clip for insertion or removal of an approach plate from between said jaws.

2. A timer and approach plate holder as set forth in claim 1 wherein said means for mounting said post on the control shaft comprises a spring clip having a pair of resilient legs of generally circular configuration joined together by a horizontal section on which said post is mounted, said legs adapted to straddle and frictionally engage the circular surface of said control shaft.

3. A timer and approach plate holder as set forth in claim 2 further including a spring having one end fastened to the lower end, below said shaft, of one of said legs, means for demountably connecting said spring to the lower end of the other of said legs whereby connecting the spring to the other of said legs when in a stretched condition increases the frictional engagement of said legs with the control shaft.

4. A timer and approach plate holder as set forth in claim 3 wherein said spring comprises an elastic band provided with a plurality of spaced apart transversally extending projections.

5. A timer and approach plate holder as set forth in claim 2 wherein said post has a resilient extension extending downwardly midway between said legs, the end of said resilient extension remote from said post adapted to frictionally engage the cylindrical surface of the control shaft.

6. A timer and approach plate holder as set forth in claim 5 wherein said resilient extension comprises a second post axially slideable in said first named post and a spring urging said second post in an extended position with respect of said first named post.

* * * * *